Feb. 6, 1951     J. HIGGINSON     2,540,262
SCRAPING HOOD FOR DOUBLE DISK FURROW OPENERS
Filed June 23, 1948     2 Sheets-Sheet 1
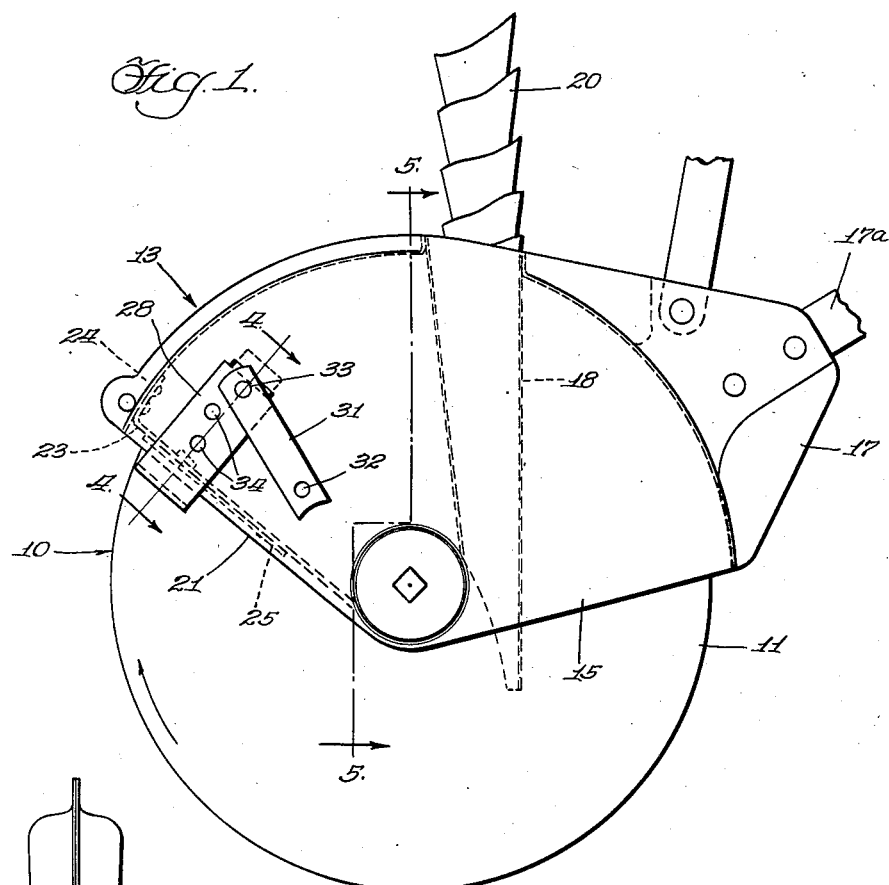
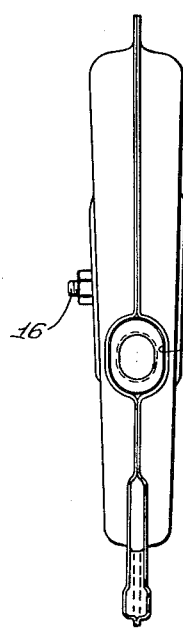
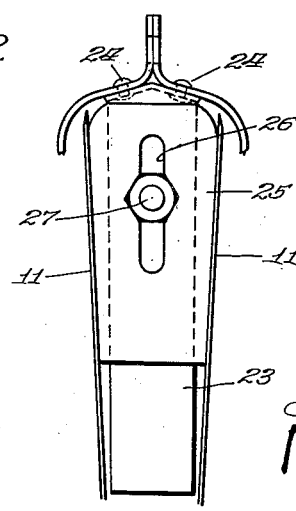
Inventor:
John Higginson
Paul O. Pippel
Atty.

Feb. 6, 1951  J. HIGGINSON  2,540,262
SCRAPING HOOD FOR DOUBLE DISK FURROW OPENERS
Filed June 23, 1948  2 Sheets-Sheet 2
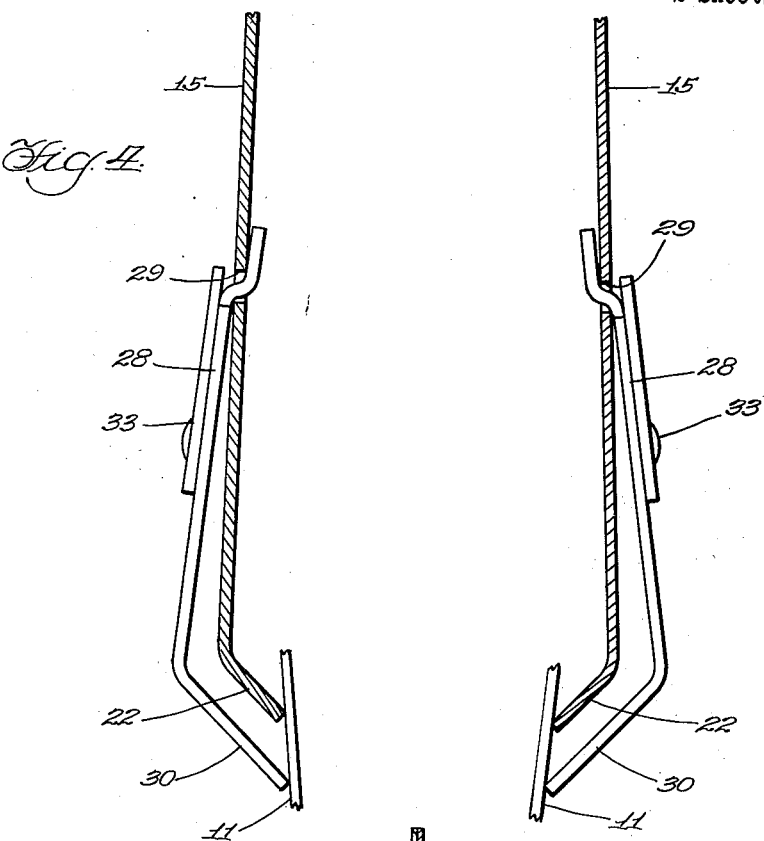
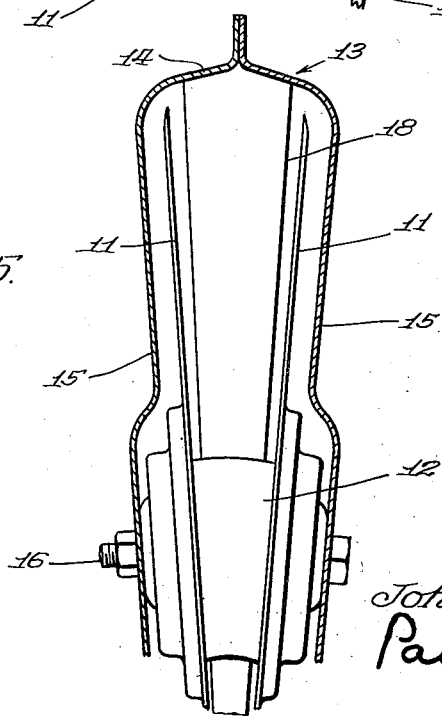
Inventor.
John Higginson
Paul O. Pippel
Atty.

Patented Feb. 6, 1951

2,540,262

UNITED STATES PATENT OFFICE 2,540,262

SCRAPING HOOD FOR DOUBLE DISK FURROW OPENERS

John Higginson, Hamilton, Ontario, Canada, assignor to International Harvester Company of Canada, Limited, Hamilton, Ontario, Canada, a corporation of Ontario Application June 23, 1948, Serial No. 34,717

6 Claims. (Cl. 97—223)

This invention relates to agricultural implements, and particularly to furrow openers for grain and fertilizer drills and the like. More specifically, the invention concerns a seed or fertilizer boot for a furrow opener of the double disk type, wherein two disks are rotatively mounted in closely spaced and downwardly converging relation to form a unit for opening a furrow in the ground for the deposition of seed or fertilizer.

In the use of double disk furrow openers the tendency of dirt and trash to adhere to the disks, to get between the disks and clog them up has presented a difficult problem. With the mechanization of farming operations and the increase in speed at which implements are propelled by tractor power, this problem has become acute and in many types of soil has rendered the use of double disk furrow openers virtually impractical.

The principal object of the present invention is to provide an improved double disk furrow opener construction for use in grain drills and the like.

Another object of the invention is to provide an improved double disk furrow opener incorporating means for preventing the accumulation of dirt between the disks.

Another object of the invention is to provide a combined seed boot and hood for a double disk furrow opener adapted to prevent foreign matter from getting between and clogging up the disks.

Other objects and advantages of the invention will become clear from the following detailed description when read in conjunction with the accompanying drawing wherein:

Fig. 1 is a view in side elevation of a furrow opener assembly incorporating the features of the present invention.

Fig. 2 is a plan view of the structure shown in Fig. 1.

Fig. 3 is an elevation looking in the direction of the trailing edge of the disk covering hood member and showing the inside scraper.

Fig. 4 is an enlarged detail of a section taken on the line 4—4 of Fig. 1.

Fig. 5 is a section taken on the line 5—5 of Fig. 1.

Referring to the drawings it may be noted that the furrow opener unit of the present invention is adapted for use with seed dispenser machines such as grain drills, and comprises an earth penetrating unit designated by the numeral 10 formed of a pair of laterally spaced disks 11 which are rotatably mounted upon a hub 12. It will be noted particularly well in Fig. 5 that the disks 11 converge in a downward direction and that their lower portions are adapted to penetrate the earth and open a furrow therein for the deposition of seed or the like.

In passing through the soil by propelling the machine of which the furrow opener unit is a part over the ground the disks tend to accumulate dirt on the outer and inner faces thereof, particularly when the soil is moist, and due to the rotation of the disks the dirt is carried around therewith and tends to become deposited and to accumulate in the vicinity of the seed boot and between the disks to clog them up and hinder the proper operation thereof. In order to keep the disks clear of dirt it is customary to provide a scraping blade to clear dirt from the outer surface thereof. However, such mechanism has not been entirely successful, particularly where a pair of disks were used together to form a double disk furrow opener unit. Thus dirt has tended to accumulate between the disks and to be carried upwardly and over the tops of the disks and therebetween to interfere with their proper operation.

To provide optimum conditions for the operation of a double disk furrow opener applicant has provided a hood 13 adapted to encase substantially the entire upper half of the disk unit 10. This hood or cover member is unitary although as indicated in Fig. 5 it may be made of two sections secured together, and comprises an upper transverse portion 14 and straddle portions 15 extending outwardly and downwardly over the outer faces of the disks. As will be observed in Fig. 1 hood 13 is arcuate and shaped in the form of a sector and the lower ends of the straddling portions 15 are secured to the disk hub 12 by a bolt 16. Hood member 13 has an enlarged portion 17 which serves for the attachment of the furrow opening unit to a drag link 17a which in turn connects the unit to the planting machine (not shown) of which the unit forms a part.

Secured to the transverse portion 14 of the hood member 13 is a seed boot 18 which extends vertically downwardly between the disks 11 to serve for the deposition of seed in the furrow formed thereby. Seed boot 18 communicates with an opening 19 in the upper portion of the hood and provides for the reception of a conventional flexible seed tube 20 through which seed is directed to the boot 18 from a source on the planting machine (not shown).

Inasmuch as the hood member 13 covers almost the entire upper portion of the disk unit 10 it is clear that dirt and other trash thrown up by other parts of the machine during the travel thereof across the field cannot be dropped between the disks to clog them up and interfere with their function. It is likewise important to prevent dirt and trash from being carried upwardly with the rotation of the disks and under the hood 13 to eventually fill the space between the hood and the disks and thereby carried between the disks. In order to avoid this contingency the hood 13 is provided with means for preventing dirt being carried thereunder. As will be noted in Fig. 1 the disks of the disk unit 10 will rotate in the direction indicated by the arrow and dirt clinging thereto will be carried upwardly toward the edge 21 of the sector shaped hood. This edge is the trailing or disk-entering edge of the hood toward which the dirt is carried, and this edge on each side of the disk unit 10 is turned inwardly as indicated in Fig. 4 to form a flange 22. This flange 22 substantially engages the outer face of each of the disks 11 and operates to scrape the dirt therefrom during the rotation thereof.

Also secured to and forming a part of the hood member 13 is a plate 23 which is affixed to the transverse portion 14 of the hood by bolts 24 and extends downwardly parallel to the edge 21 of the hood. This plate member 23 serves for the connection thereto of a scraper blade 25, the edges of which engage the inner faces of the disks 11 as indicated in Fig. 3. Blade 25 is provided with a slot 26 for the reception of a bolt 27 carried by the plate 23 so that the blade member 25 may be adjustably secured to the plate member. Dirt is thus effectively kept from traveling up the disks and from getting therebetween or under the hood 13.

An auxiliary dirt scraper is provided in the form of a blade 28 which has one end thereof narrowed for reception in a slot 29 formed in each of the straddling portions 15 of the hood member 13. The body of the blade 28 extends outwardly and downwardly and has an inwardly bent flange portion 30 which engages the outer face of each of the disks 11. This blade is held in contact with the face of the disk by means of a spring steel strap 31 which is pivotally secured at 32 to the hood member and is connected to the blade 28 by a bolt 33. The tension upon the blade 28 may be adjusted by securing the spring steel pressure member 31 to the blade at any of a plurality of openings 34 formed therein.

It will be clear from the foregoing description that applicant has devised a novel organization of a furrow opener unit for use with a grain drill or the like which operates with maximum efficiency and with minimum interference by clogging of the parts with dirt which normally adheres to the disks during operation thereof. It is to be understood that the invention has been described in its preferred embodiment and that modifications may be made therein without departing from the spirit of the invention or the scope of the appended claims.

What is claimed is:

1. For use with a furrow opener unit comprising a hub and a pair of closely spaced disks rotatively mounted thereon in downwardly converging relation: a sector-shaped hood member enclosing the upper portion of said disks, the straddling portions of said hood extending downwardly over the outer faces of the disks and being secured to the hub thereof, and means carried by said hood member for scraping dirt simultaneously from the outer and inner faces of each of said disks.

2. For use with a furrow opener unit comprising a hub and a pair of closely spaced disks rotatively mounted thereon in downwardly converging relation: a sector-shaped hood member straddling said disks, the straddling portions of said member extending over the outer faces of the disks and being secured to the hub thereof, and an inwardly turned flange formed on the edge of said hood member rearwardly of the hub and engageable with the outer faces of said disks to scrape dirt from the disks during rotation thereof.

3. For use with a furrow opener unit comprising a hub and a pair of closely spaced disks rotatively mounted thereon in downwardly converging relation: a sector-shaped hood member straddling said disks, the straddling portions of said member extending over the outer faces of the disks and being secured to the hub thereof, and means associated with the disk-entering edge of the hood member to prevent entrance of dirt under the hood and subsequent deposition thereof between the disks comprising a blade member pivotally anchored to the hood member and having a dirt scraping edge extending beyond the hood to a position in substantial engagement with the adjacent disk face, and a spring steel pressure member anchored at one end to the hood member and having its other end adjustably connectable to the blade member to vary the tension therefrom.

4. For use with a furrow opener unit comprising a hub and a pair of closely spaced disks rotatively mounted thereon in downwardly converging relation: a sector-shaped hood member straddling said disks, the straddling portions of said member extending over the outer faces of the disks and being secured to the hub thereof, said traddling portions having disk-entering and disk-leaving edges with respect to the direction of rotation of the disk, and means associated with the disk-entering edge of the hood member to prevent entrance of foreign matter under the hood and subsequent deposition thereof between the disks comprising a flange formed on the disk-entering edge of the hood member at opposite sides of the disk unit, said flange extending inwardly toward the adjacent disk face to scrape dirt therefrom during rotation thereof.

5. For use with a furrow opener unit comprising a hub and a pair of closely spaced disks rotatively mounted thereon in downwardly converging relation: a sector-shaped hood member straddling said disks, the straddling portions of said member extending over the outer faces of the disks and being secured to the hub thereof, said straddling portions having disk-entering and disk-leaving edges with respect to the direction of rotation of the disk, and means associated with the disk-entering edge of the hood member to prevent entrance of foreign matter under the hood and subsequent deposition thereof between the disks comprising a flange formed on the disk-entering edge of the hood member at opposite sides of the disk unit, said flange extending inwardly toward the adjacent disk face to scrape dirt therefrom during rotation thereof, and auxiliary scraping means associated with the disk-entering edge of the hood member including a blade member adjustably anchored to the hood member and having a dirt scraping edge extending inwardly toward the adjacent disk face, and means for adjusting the tension on said blade member.

6. For use with a furrow opener unit comprising a hub and a pair of closely spaced disks rotatively mounted thereon in downwardly converging relation: a sector-shaped hood member straddling said disks, the straddling portions of said member extending over the outer faces of the disks and being secured to the hub thereof, said straddling portions having disk-entering and disk-leaving edges with respect to the direction of rotation of the disk, and means associated with the disk-entering edge of the hood member to prevent entrance of foreign matter under the hood and subsequent deposition thereof between the disks comprising a flange formed on the disk-entering edge of the hood member at opposite sides of the disk unit, said flange extending inwardly toward the adjacent disk face to scrape dirt therefrom during rotation thereof, and auxiliary scraping means associated with the disk-entering edge of the hood member including a blade member adjustably anchored to the hood member and having a dirt scraping edge extending inwardly toward the adjacent disk face, and means for adjusting the tension on said blade member comprising a spring steel pressure member anchored at one end to the hood member and having its other end adjustably connectable to the blade member to vary the tension thereupon.

JOHN HIGGINSON.

REFERENCES CITED

The following references are of record in the file of this patent:

UNITED STATES PATENTS

| Number | Name | Date |
| --- | --- | --- |
| 1,120,087 | Roemer | Dec. 8, 1914 |
| 1,410,883 | Bozard | Mar. 28, 1922 |